(12) United States Patent
Jung et al.

(10) Patent No.: US 9,626,078 B2
(45) Date of Patent: Apr. 18, 2017

(54) MOBILE TERMINAL

(71) Applicant: LG ELECTRONICS INC., Seoul (KR)

(72) Inventors: Mijin Jung, Seoul (KR); Shinjae Jeong, Seoul (KR); Soohwan Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/805,820

(22) Filed: Jul. 22, 2015

(65) Prior Publication Data

US 2015/0324072 A1    Nov. 12, 2015

Related U.S. Application Data

(63) Continuation of application No. 13/734,375, filed on Jan. 4, 2013, now Pat. No. 9,123,234.

(60) Provisional application No. 61/583,628, filed on Jan. 6, 2012.

(51) Int. Cl.
| | |
|---|---|
| *G05B 15/02* | (2006.01) |
| *G06F 3/0482* | (2013.01) |
| *G08C 17/02* | (2006.01) |
| *G08C 23/04* | (2006.01) |

(52) U.S. Cl.
CPC .......... *G06F 3/0482* (2013.01); *G05B 15/02* (2013.01); *G08C 17/02* (2013.01); *G08C 23/04* (2013.01); *G08C 2201/50* (2013.01); *G08C 2201/61* (2013.01); *G08C 2201/93* (2013.01)

(58) Field of Classification Search
CPC .......... G08C 17/02; G08C 23/04; H05B 6/06; G06F 3/0482; G05B 15/02
USPC ................. 340/12.5; 219/391–394, 620, 681
See application file for complete search history.

(56) References Cited

U.S. PATENT DOCUMENTS

| | | | | |
|---|---|---|---|---|
| 5,827,556 A | * | 10/1998 | Maher, Jr. ..................... 426/233 |
| 6,907,447 B1 | * | 6/2005 | Cooperman ......... G06Q 10/107 709/203 |
| 2007/0158335 A1 | * | 7/2007 | Mansbery ............ H05B 6/6435 219/505 |
| 2007/0180649 A1 | * | 8/2007 | Pullins ...................... A47L 9/19 15/339 |
| 2007/0246451 A1 | * | 10/2007 | Willett ..................... A21B 1/44 219/394 |
| 2009/0134151 A1 | * | 5/2009 | Bogatin et al. ............... 219/681 |
| 2011/0055027 A1 | * | 3/2011 | Suzuki et al. .................. 705/15 |
| 2011/0084835 A1 | * | 4/2011 | Whitehouse et al. ........ 340/540 |
| 2012/0199643 A1 | * | 8/2012 | Minnick et al. .............. 235/375 |
| 2013/0052946 A1 | * | 2/2013 | Chatterjee et al. .......... 455/41.1 |
| 2013/0121481 A1 | * | 5/2013 | Mikan .................... H04L 51/10 379/88.14 |

* cited by examiner

*Primary Examiner* — Joseph Feild
*Assistant Examiner* — Omar Casillashernandez
(74) *Attorney, Agent, or Firm* — Dentons US LLP

(57) ABSTRACT

A mobile terminal is disclosed. The mobile terminal can transmit/receive information or a signal to/from a cooking apparatus, improve user convenience, remotely monitor a state of the cooking apparatus, and receive a control command with respect to the cooking apparatus.

18 Claims, 14 Drawing Sheets

MOBILE TERMINAL

This application is a continuation of application Ser. No. 13/734,375 filed Jan. 4, 2013, which claims the benefit of U.S. Provisional Application No. 61/583,628, which is incorporated by reference in their entirety herein.

BACKGROUND OF THE INVENTION

Field of the Invention

The present invention relates to a mobile terminal, and more particularly, to a mobile terminal capable of transmitting/receiving information or a signal to/from a cooking apparatus, improving user convenience, remotely monitoring a state of the cooking apparatus, and receiving a control command with respect to the cooking apparatus.

Discussion of the Related Art

Home appliances such as cooking apparatuses, refrigerators, washing machines, etc. execute functions corresponding to their characteristics to provide convenience to users.

Recently, a 'home network' configured in such a manner that home appliances are connected to a network has been provided, and thus a user can remotely control the home appliances through the home network.

Furthermore, with the development of smartphones, various applications capable of remotely monitoring states of home appliances or driving the home appliances through a home network have been developed and efforts are being made to improve user interfaces of applications installed in smartphones are made.

In the case of a cooking apparatus such as an oven, a cooking process includes various steps of preheating, cooking or deodorization, which are selectively or sequentially performed, and a user can perform each step by manipulating a control panel provided to the cooking apparatus. Upon completion of each step, the cooking apparatus provides completion information to the user through sound.

Accordingly, the user has to check the cooking apparatus in order to perform each step or check the state of the cooking apparatus. This is inconvenient for the user.

SUMMARY OF THE INVENTION

Accordingly, the present invention is directed to a mobile terminal that substantially obviates one or more problems due to limitations and disadvantages of the related art.

An object of the present invention is to provide a mobile terminal capable of transmitting/receiving information or a signal to/from a cooking apparatus and improving user convenience.

Another object of the present invention is to provide a mobile terminal capable of remotely monitoring a state of a cooking apparatus and receiving a control command with respect to the cooking apparatus.

Another object of the present invention is to provide a mobile terminal capable of checking a state of a cooking apparatus in real time and remotely performing a preheating step and a self-cleaning step.

A further object of the present invention is to provide a mobile terminal capable of effectively displaying information about a state of a cooking apparatus and recommending subsequent processes upon completion of a cooking process such that a user can select a subsequent process.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal includes a wireless communication unit for communication with a cooking apparatus, a display unit for displaying predetermined information, an application implemented on the display unit and including a user interface relating to the cooking apparatus, and a controller for controlling the application, receiving state information of the cooking apparatus through the wireless communication unit, and transmitting a control command with respect to the cooking apparatus, wherein the controller displays an execution screen including one or more menu items upon execution of the application, the menu items including a smart access menu for requesting communication with the cooking apparatus, the controller displays, on the display unit, a window including a cooking apparatus state display area in which a state of the cooking apparatus is displayed and an icon display area in which an icon including at least one of a photo, symbol and picture relating to the cooking apparatus is displayed upon selection of the smart access menu.

The state of the cooking apparatus may include a waiting state or an operating state, and the operating state may include a cooking state, a cooling state or a self-cleaning state.

When the operating state corresponds to the cooking state, the controller may display, on the display unit, a window including a cooking information display area in which at least one of a cook mode and the name of a dish is displayed, a cooking time display area in which at least one of a cooking start time, a cooking end time, a cooking processing time and a remaining time is displayed, and a cooking temperature display area in which a cooking temperature is displayed.

The controller may display a pop-up window for displaying cooking completion indication information on the display unit upon receiving a cooking completion signal from the cooking apparatus.

The controller may convert information displayed on at least one of the cooking time display area and the cooking temperature display area into cooking completion indication information upon receiving the cooking completion signal from the cooking apparatus.

The controller may display a pop-up window for displaying cooking completion indication information on the display unit upon receiving the cooking completion signal from the cooking apparatus while the application is not activated.

The controller may display a pop-up window for recommending a self-cleaning process on the display unit upon receiving the cooking completion signal from the cooking apparatus, and the pop-up window may include an input menu by which the self-cleaning process is selected.

When the operating state corresponds to the self-cleaning state, the controller may display, on the display unit, a window including a self-cleaning information display area in which a self-cleaning degree is displayed and a self-cleaning time display area in which at least one of a start time, an end time, a self-cleaning processing time and a remaining time is displayed.

The window may include an icon display area in which progress of self-cleaning is indicated through a graph.

The controller may display a pop-up window for displaying self-cleaning completion indication information on the display unit upon receiving a self-cleaning completion signal from the cooking apparatus.

The controller may display a pop-up window for displaying self-cleaning completion indication information on the display unit upon receiving the self-cleaning completion signal from the cooking apparatus while the application is not activated.

The controller may display a window including a cooking apparatus state display area in which a waiting state of the cooking apparatus is displayed and an icon display area in which an icon including at least one of a photo, symbol and picture relating to the cooking apparatus is displayed on the display unit upon selection of the pop-up window.

The controller may display a window including a cooking apparatus state display area in which a cooling state of the cooking apparatus is displayed and an icon display area in which an icon including at least one of a photo, symbol and picture relating to the cooking apparatus is displayed on the display unit upon selection of the pop-up window.

When the state of the cooking apparatus corresponds to the waiting state, at least one of a pre-heating menu and a self-cleaning menu may be additionally displayed on the window and, when the pre-heating menu or the self-cleaning menu is selected, the controller may control the cooking apparatus to perform a process corresponding to the selected menu.

In another aspect of the present invention, a mobile terminal includes a wireless communication unit for communication with a cooking apparatus, a display unit for displaying predetermined information, an application implemented on the display unit and including a user interface relating to the cooking apparatus, and a controller for controlling the application, receiving state information of the cooking apparatus through the wireless communication unit, and transmitting a control command with respect to the cooking apparatus, wherein the controller displays an execution screen including one or more menu items upon execution of the application, the menu items including a smart access menu for requesting communication with the cooking apparatus, wherein, when the smart access menu is selected and a state of the cooking apparatus corresponds to a cooking state, the controller displays, on the display unit, a window including a cooking information display area in which at least one of a cook mode and the name of a dish is displayed, a first cooking time display area in which at least one of a cooking start time, a cooking end time and a cooking processing time is displayed, a cooking temperature display area in which a cooking temperature is displayed, a second cooking time display area in which a remaining time is displayed, and an icon display area in which progress of a cooking process is indicated through a graph.

The second cooking time display area may be located between the cooking information display area and the first cooking time display area, the icon display area may be arranged surrounding the second cooking time display area, and the cooking temperature display area may be located between the first cooking time display area and the second cooking time display area.

In another aspect of the present invention, a mobile terminal includes a wireless communication unit for communication with a cooking apparatus, a display unit for displaying predetermined information, an application implemented on the display unit and including a user interface relating to the cooking apparatus, and a controller for controlling the application, receiving state information of the cooking apparatus through the wireless communication unit, and transmitting a control command with respect to the cooking apparatus, wherein the controller displays an execution screen including one or more menu items upon execution of the application, the menu items including a smart access menu for requesting communication with the cooking apparatus, wherein, when the smart access menu is selected and a state of the cooking apparatus corresponds to a self-cleaning state, the controller displays, on the display unit, a window including a self-cleaning information display area in which a self-cleaning degree is displayed, a first self-cleaning time display area in which at least one of a self-cleaning start time, a self-cleaning end time and a self-cleaning processing time is displayed, a second self-cleaning time display area in which a remaining time is displayed, and an icon display area in which progress of a self-cleaning process is indicated through a graph.

The second self-cleaning time display area may be located between the self-cleaning information display area and the first self-cleaning time display area, and the icon display area may be arranged surrounding the second self-cleaning time display area.

As described above, in the mobile terminal according to the embodiments of the present invention, it is possible to transmit/receive information or a signal to/from a cooking apparatus and to improve user convenience.

Furthermore, the mobile terminal according to the embodiments of the present invention can remotely monitor a state of a cooking apparatus and receive a control command with respect to the cooking apparatus.

Moreover, the mobile terminal according to the embodiments of the present invention can check a state of a cooking apparatus in real time and remotely perform a preheating step and a self-cleaning step.

In addition, the mobile terminal according to the embodiments of the present invention can effectively display information about a state of a cooking apparatus and recommend subsequent processes upon completion of a cooking process such that a user can select a subsequent process.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
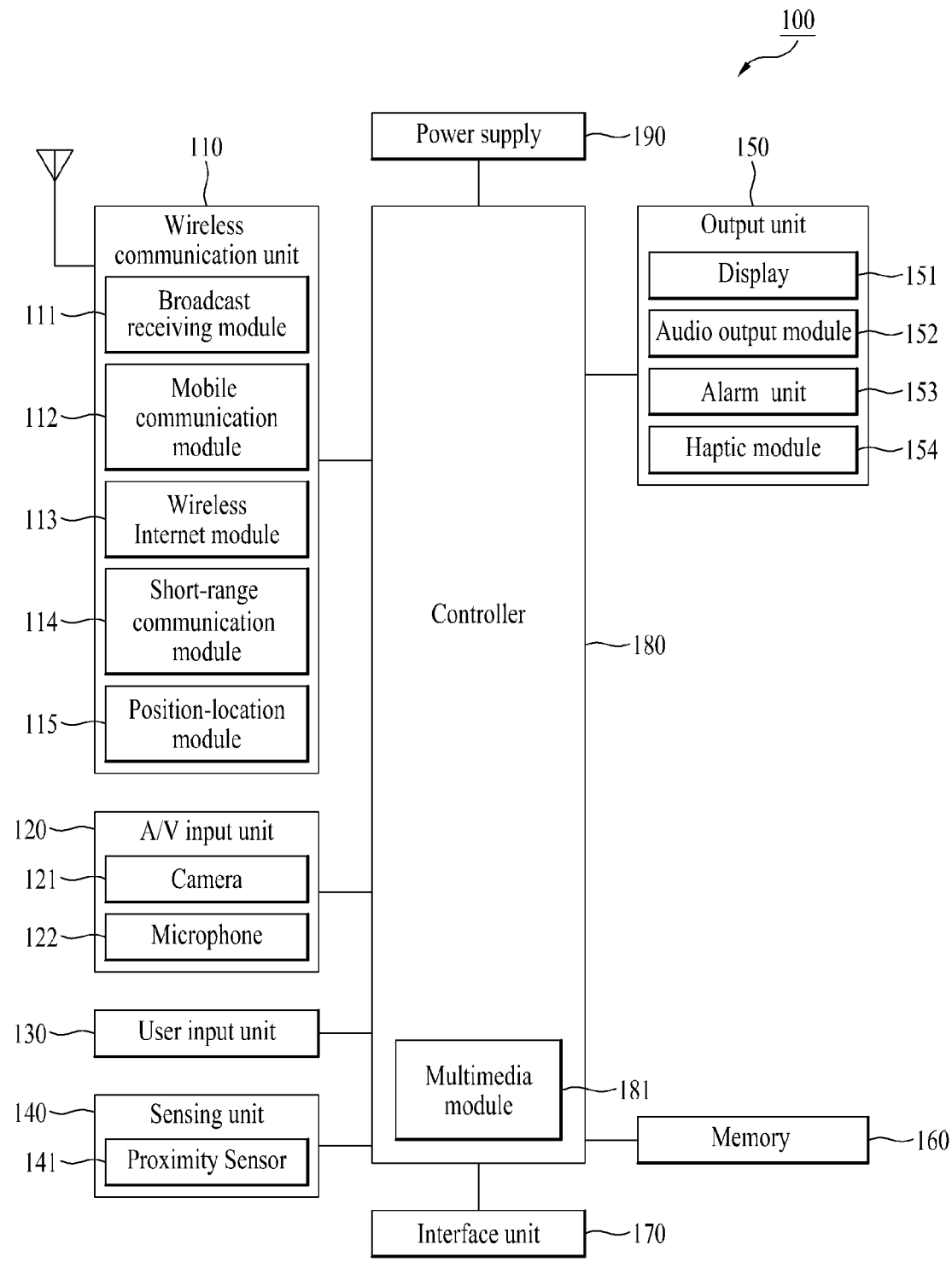
FIG. 1 is a block diagram of a mobile terminal according to an exemplary embodiment of the present invention.

FIG. 1 is a block diagram of a mobile terminal 100 in accordance with an embodiment of the present invention. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located. In case of non-mobile terminals, the wireless communication unit 110 can be replaced with a wire communication unit. The wireless communication unit 110 and wire communication unit can be commonly referred to as a communication unit.

A broadcast receiving module 111 receives a broadcast signal and/or broadcast associated information from an external broadcast managing entity via a broadcast channel. The broadcast channel may include a satellite channel and a terrestrial channel. The broadcast managing entity generally refers to a system which transmits a broadcast signal and/or broadcast associated information.

At least two broadcast receiving modules 111 can be provided to the mobile terminal 100 in pursuit of simultaneous receptions of at least two broadcast channels or broadcast channel switching facilitation.

Examples of broadcast associated information include information associated with a broadcast channel, a broadcast program, a broadcast service provider, etc. For example, the broadcast associated information may include an electronic program guide (EPG) of digital multimedia broadcasting (DMB) and an electronic service guide (ESG) of digital video broadcast-handheld (DVB-H).

The broadcast signal may be implemented, for example, as a TV broadcast signal, a radio broadcast signal, and a data broadcast signal. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. If desired, data received by the broadcast receiving module 111 may be stored in a suitable device, such as a memory 160.

A mobile communication module 112 communicates wireless signals with one or more network entities such as a base station or Node-B. Such signals may represent, for example, audio, video, multimedia, control signaling, and data.

A wireless internet module 113 supports Internet access for the mobile terminal 100. This module may be internally or externally coupled to the mobile terminal 100. Suitable technologies for wireless internet may include, but are not limited to, WLAN (Wireless LAN) (Wi-Fi), Wibro (Wireless broadband), Wimax (World Interoperability for Microwave Access), and HSDPA (High Speed Downlink Packet Access). The wireless internet module can be replaced with a wire internet module in non-mobile terminals. The wireless internet module 113 and wire internet module may be commonly referred to as an internet module.

A short-range communication module 114 facilitates relatively short-range communications. Suitable technologies for short-range communication my include, but are not limited to, radio frequency identification (RFID), infrared data association (IrDA), ultra-wideband (UWB), as well as the networking technologies commonly referred to as Bluetooth and ZigBee.

A position-location module 115 identifies or otherwise obtains the location of the mobile terminal 100. This module may be implemented using, for example, global positioning system (GPS) components which cooperate with associated satellites, network components, and combinations thereof.

According to the current technology, the GPS module 115 is able to precisely calculate current 3-dimensional position information based on longitude, latitude and altitude by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

An audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video.

A microphone 122 receives an external audio signal while the portable device is in a particular mode, such as phone call mode, recording mode or voice recognition mode. This audio signal is processed and converted into digital data.

The portable device, and specifically the A/V input unit 120, typically includes assorted noise removing algorithms to remove noise generated in the course of receiving the external audio signal. Data generated by the A/V input unit 120 may be stored in the memory 160, utilized by the output unit 150, or transmitted via one or more modules of communication unit 110. If desired, two or more microphones and/or cameras may be used.

A user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a display, which will be described in more detail below.

A sensing unit 140 provides status measurements of various aspects of the mobile terminal 100. For example, the sensing unit may detect an open/close status of the mobile terminal 100, relative positioning of components such as a display and keypad of the mobile terminal, a change of position of the mobile terminal or a component of the mobile terminal, a presence or absence of user contact with the mobile terminal, orientation or acceleration/deceleration of the mobile terminal.

If the mobile terminal 100 is configured as a slide-type mobile terminal, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

An interface unit 170 is often implemented to couple the mobile terminal with external devices. Typical external devices include wired/wireless headphones, external chargers, power supplies, storage devices configured to store data such as audio, video, and pictures, as well as earphones and microphones. The interface unit 170 may be configured using a wired/wireless data port, audio input/output ports, video input/output port, a card socket for coupling to a memory card, a subscriber identity module (SIM) card, a user identity module (UIM) card, or removable user identity module (RUIM) card).

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

An output unit 150 generally includes various components that support the output requirements of the mobile terminal 100. A display 151 is typically implemented to visually display information associated with the mobile terminal 100. For example, if the mobile terminal 100 is operating in a phone call mode, the display will generally provide a user interface or graphical user interface that includes information associated with placing, conducting, and terminating a phone call. As another example, if the mobile terminal 100 is in a video call mode or a photographing mode, the display 151 may additionally or alternatively display images associated with these modes.

One particular implementation includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display.

Some of the above displays can be configured transparent so that an external environment can be seen through the corresponding display. Such a display can be called a transparent display. As a representative example for the transparent display, there is a transparent LCD display or the like.

The mobile terminal 100 may include one or more of displays 151. An example of a two-display embodiment is one in which one display 151 is configured as an internal display viewable when the terminal is in an opened position and a second display 151 configured as an external display viewable in both the open and closed positions.

The touchscreen can be configured to detect a touch input pressure as well as a touch input position and size.

Meanwhile, a proximity sensor 141 can be provided within or around the touchscreen. The proximity sensor detects an object approaching a prescribed detecting surface or a presence or non-presence of an object existing around itself using an electromagnetic power or infrared rays without mechanical contact. Hence, the proximity sensor is superior to a contact sensor in lifespan and utilization.

Example for an operational principle of the proximity sensor is explained as follows. First of all, if an object approaches a sensor detecting surface while an oscillation circuit oscillates a sine radio frequency, an oscillation amplitude of the oscillation circuit attenuates or stops. This change is converted to an electric signal to detect a presence or non-presence of the object. So, even if any material except a metallic comes between the RF oscillation proximity sensor and the object, a proximity switch is able to detect the object to detect without interference with the material.

In spite of not providing the proximity sensor, if the touchscreen is electrostatic, it can be configured to detect the proximity of a pointer through an electric field change attributed to the proximity of the pointer.

So, in case that the pointer is placed in the vicinity of the touchscreen without being actually contacted with the touchscreen, it is able to detect a position of the pointer and a distance between the pointer and the touchscreen. For clarity and convenience of explanation, an action for enabling the pointer approaching the touchscreen to be recognized as placed on the touchscreen is named 'proximity touch' and an action of enabling the pointer to actually come into contact with the touchscreen is named 'contact touch'. And, a position, at which the proximity touch is made to the touchscreen using the pointer, means a position of the pointer vertically corresponding to the touchscreen when the pointer makes the proximity touch.

If the proximity sensor is used, it is able to sense a proximity touch and its pattern (e.g., proximity touch distance, proximity touch direction, proximity touch speed, proximity touch position, proximity touch moving state, etc.). And, it is also able to output information corresponding to the sensed proximity touch action and the proximity touch pattern to the touch screen.

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

The audio output module 152 functions in various modes such as call-receiving mode, call-placing mode, recording mode, voice recognition mode and broadcast reception mode. During operation, the audio output module 152 outputs audio relating to a particular function or status, such as call received, message received, or errors.

The output unit 150 is further shown having an alarm 153, which is commonly used to signal or otherwise identify the occurrence of a particular event associated with the mobile terminal 100. Typical events include call received, message received and user input received.

An example of a signal provided by the output unit 150 is tactile sensations. For example, the alarm 153 may be configured to vibrate responsive to the mobile terminal 100 receiving a call or message. As another example, vibration is provided by the alarm 153 responsive to receiving user input at the mobile terminal 100, thereby providing a tactile feedback mechanism. It is understood that the various signals provided by the components of output unit 150 may be separately performed or performed using any combination of such components.

A memory 160 is generally used to store various types of data to support the processing, control, and storage requirements of the mobile terminal 100. Examples of such data include program instructions for applications operating on the mobile terminal 100, contact data, phonebook data, messages, pictures, and video.

Moreover, data for various patterns of vibration and/or sound outputted in case of a touch input to the touch screen can be stored in the memory 160.

As map information can be stored in the memory 160, user's convenience can be further provided in a manner of providing the map information to a user if necessary. Moreover, a recent use history or a cumulative use frequency of each menu in the mobile terminal can be stored in the memory 160.

The memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

A controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

A power supply 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments may also be implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
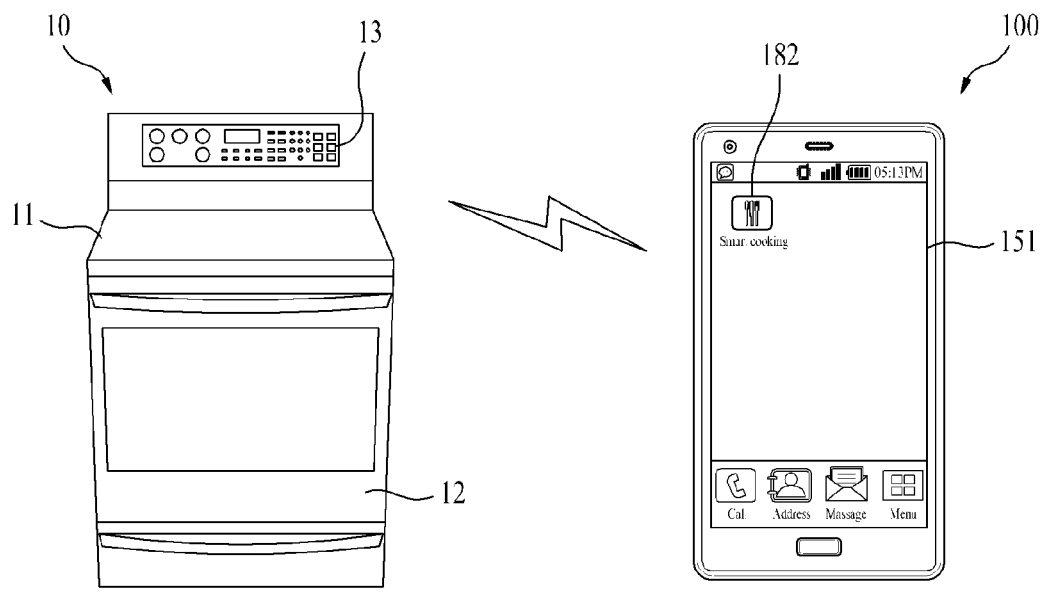
FIG. 2 illustrates the mobile terminal and a cooking apparatus according to an exemplary embodiment of the present invention.
Figure 3:
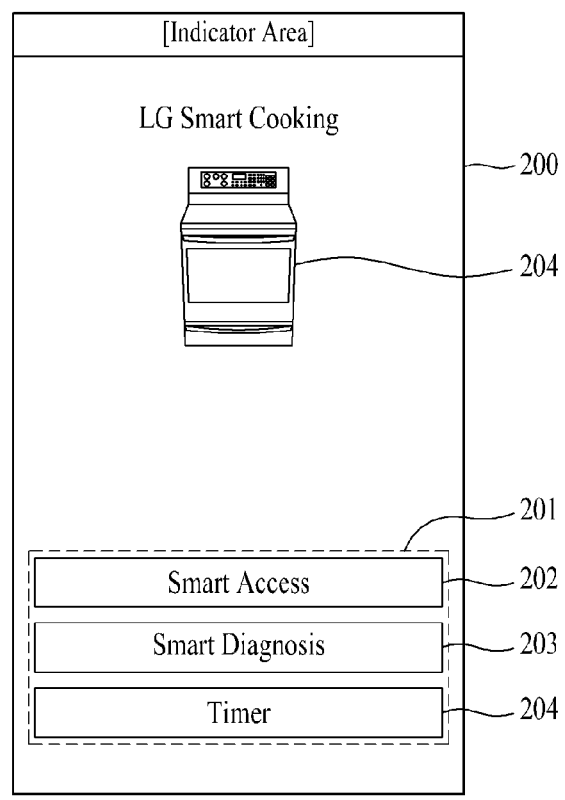
FIG. 3 shows an application execution screen of the mobile terminal according to an exemplary embodiment of the present invention.

FIG. 2 illustrates the mobile terminal 100 and a cooking apparatus 10 according to an exemplary embodiment of the present invention and FIG. 3 shows an application execution screen of the mobile terminal 100 according to an exemplary embodiment of the present invention.

It is assumed that the cooking apparatus 10 is an oven 10 for convenience of description.

Referring to FIG. 2, the oven 10 includes a body 11 having a cooking chamber in which cooking is performed, a door 12 for selectively opening and closing the cooking chamber, and a control panel 13 for receiving a control command and displaying state information. In addition, the oven 10 includes a communication module (not shown) for communication with an external device (e.g. an external server, a home network and/or a mobile terminal).

The mobile terminal 100 and the oven 10 can communicate with each other in various manners and be linked to each other through Wi-Fi, Bluetooth and/or ZigBee, for example.

The mobile terminal 100 and the oven 10 can be linked to each other via a home network or an external server (not shown) such that they can communicate with each other. Alternatively, the mobile terminal 100 and the oven 10 can be directly connected to each other without using the home network or the external server such that they can communicate with each other.

For wireless communication between the mobile terminal 100 and the oven 10, an authentication process may be required. In this case, the mobile terminal 100 and the oven 10 can authenticate each other through an external server.

An ID and a password of a user and the model name or product code of the oven 10 may be necessary for mutual authentication of the mobile terminal 100 and the oven 10. Mutual authentication may be necessary when communication is initially performed and an additional authentication procedure may not be needed after mutual authentication.

The mobile terminal 100 according to an exemplary embodiment of the present invention includes a wireless communication unit 110 for communication with the oven 10, a display unit 151 for displaying predetermined information, and an application 182 which is displayed on the display unit 151 and includes a user interface relating to the oven 10, and a controller 180 for controlling the application 182, receiving state information of the oven 10 through the wireless communication unit 110 and transmitting a control command with respect to the oven 10.

Referring to FIGS. 2 and 3, upon execution of the application 182, the controller 180 displays an execution screen 200 including one or more menu items 202, 203 and 204 on the display unit 151. The menu items include a smart access menu 202 for requesting communication with the oven 10.

The execution screen 200 may include an icon display area 204 in which an icon including at least one of a photo, symbol and picture relating to the oven 10 is displayed. In an exemplary embodiment, a photo of the oven 10 can be displayed on the icon display area 204.

The menu items can include a diagnosis menu 203 for diagnosing the oven 10 and a timer menu 204 in addition to the smart access menu 202. The menu items 202, 203 and 204 can form a menu display area 201. In an exemplary embodiment, the menu display area 201 and the icon display area 204 can be separately displayed on the execution screen 200.

Upon selection of the smart access menu 202, the controller 180 can display, on the display unit 151, a window including an oven state display area in which an oven state is displayed and an icon display area in which an icon including at least one of a photo, symbol and picture relating to the oven is displayed.

The oven state includes a waiting state or an operating state. The waiting state refers to a power standby state, that is, a state in which the oven does not operate, and can include both an on state and an off state of the oven 10.

The operating state includes a cooking state, a cooling state and a self-cleaning state. The cooking state refers to a state in which a cooking process is performed, the cooking state refers to a state in which a cooling process is performed, and the self-cleaning state means a state in which a self-cleaning process is carried out.

The cooling process is a process for decreasing the temperature of the oven 10 before the oven 10 is switched to the waiting state from the cooking state.

Specifically, the cooling process discharges the air inside the cooking chamber and introduces outside air into the cooking chamber by operating a fan included in the oven 10.

The cooling process may be performed after the cooking process and the self-cleaning process, and the oven 10 may be switched to the waiting state upon completion of the cooling process.

The self-cleaning process is a process for deodorizing, sterilizing and/or cleaning the cooking chamber. The self-cleaning process can be performed after the cooking process, in general. The number of self-cleaning processes and a self-cleaning time can be determined according to type of cooking and recipe.

Figure 4A:
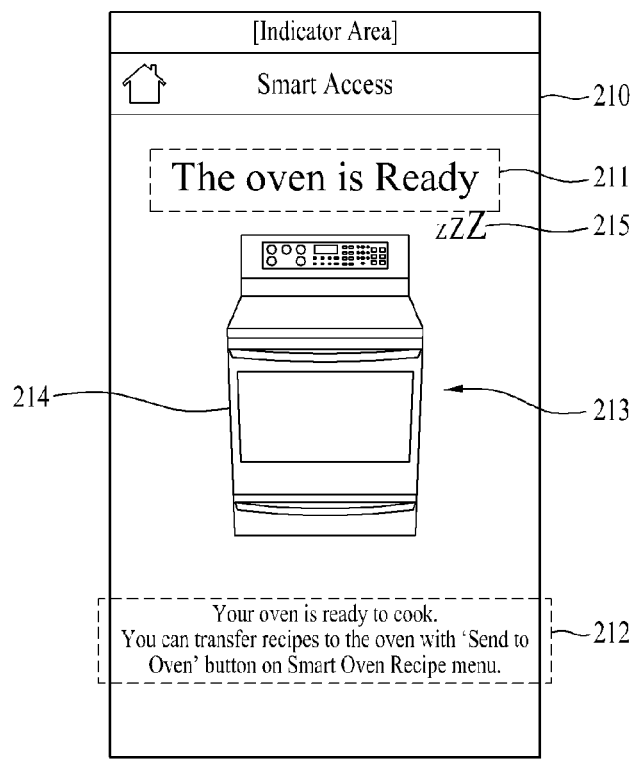
FIGS. 4A and 4B show windows which display information related to a waiting state of the cooking apparatus.
Figure 4B:
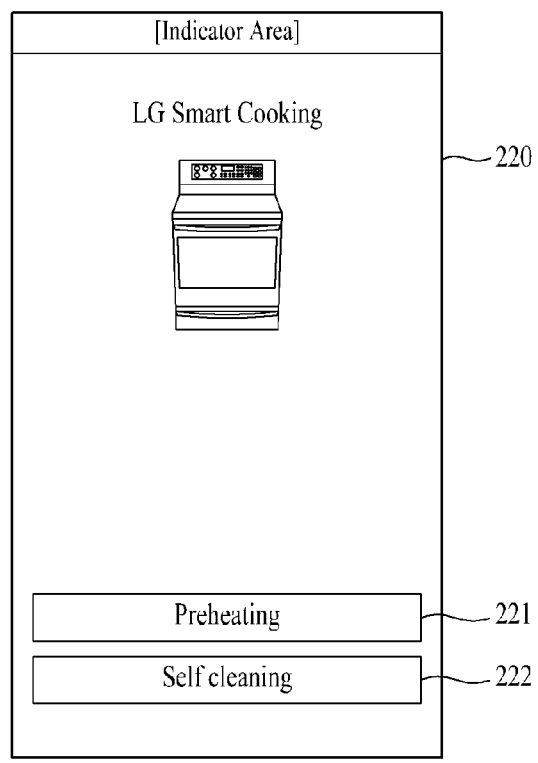

FIGS. 4A and 4B show windows which display information related to the waiting state of the cooking apparatus.

Referring to FIG. 4A, when the oven 10 is in the waiting state, the display 151 displays a window 210 including oven state display areas 211 and 212 in which the oven state is displayed and an icon display area 213 in which an icon including at least one of a photo, symbol and picture relating to the oven 10 is displayed.

Referring to FIGS. 3 and 4A, when the smart access menu 202 of the execution screen 200 is selected and the oven 10 is in the waiting state, the execution screen 200 is changed to the window 210 on the display unit 151.

For convenience of description, the window 210 displaying the waiting state of the oven 10 may be referred to as a waiting state window.

Specifically, the oven state display areas 211 and 212 can include the first waiting state display area 211 and the second waiting state display area 212, and the icon display area 213 can be located between the first waiting state display area 211 and the second waiting state display area 212.

In an exemplary embodiment, the first waiting state display area 211 can be located at the top of the display unit 151, the icon display area 213 can be located at the center of the display unit 151, and the second waiting state display are 212 can be located at the bottom of the display unit 151.

The first waiting state display area 211 simply displays the waiting state of the oven, whereas the second waiting state display area 212 displays a detailed oven state including a door closed state, etc.

The icon display area 213 can display a photo 214 of the oven 10 and a symbol 215 indicating a state of the oven 10.

Referring to FIG. 4B, when the oven 10 is in the waiting state, at least one of a pre-heating menu 221 and a self-cleaning menu 222 can be displayed on a window 220. For convenience of description, the window 220 may be referred to as a control command window.

The controller 180 can display the control command window 220 on the display 151 when a user taps the waiting state window 210 displayed on the display 151.

Alternatively, the pre-heating menu 221 and the self-cleaning menu 222 may be displayed on the menu display area 201 of the execution screen 200, as shown in FIG. 3.

Upon selection of the pre-heating menu 211 or the self-cleaning menu 222, the controller 180 can control the oven 10 to perform a process corresponding to the selected menu.

FIGS. 5A to 5F show windows which display information related to cooking states of the cooking apparatus.

Figure 5A:
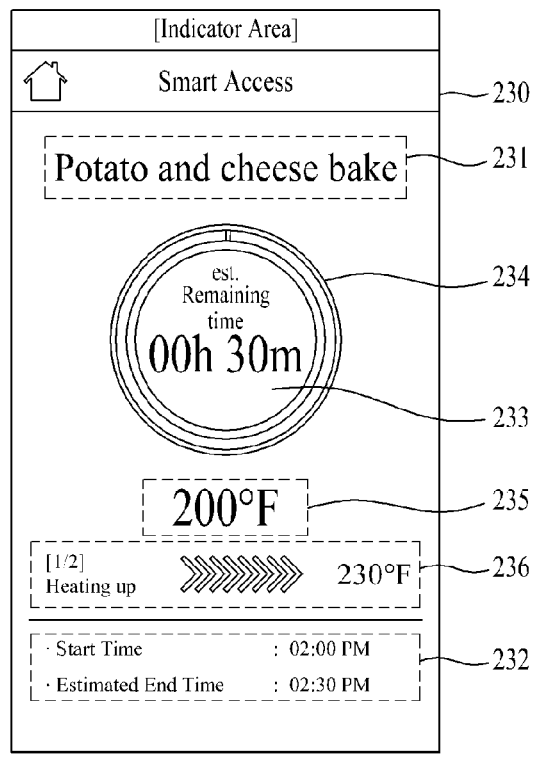
FIGS. 5A to 5F show windows which display information related to cooking states of the cooking apparatus.

Referring to FIG. 5A, when the oven is in a cooking state, the controller 180 can display, on the display unit 151, a window 230 including a cooking information display area 231 in which at least one of a cook mode and the name of a dish is displayed, cooking time display areas 232 and 233 in which at least one of a start time, an end time, a cooking processing time and a remaining time is displayed, and a cooking temperature display area 235 in which a cooking temperature is displayed.

Specifically, referring to FIGS. 3 and 5A, when the smart access menu 202 is selected and the oven is in a cooking state, the controller 180 can display, on the display unit 151, the window 230 which includes the cooking information display area 231 in which at least one of a cook mode and the name of a dish is displayed, the first cooking time display area 232 in which at least one of a start time, an end time and a cooking processing time is displayed, the cooking temperature display area 235 in which a cooking temperature is displayed, the second cooking time display area 233 in which a remaining time is displayed, and an icon display area 234 in which progression of a cooking process is indicated as a graph.

The window 230 may be referred to as a cooking state window for convenience of description.

In an exemplary embodiment, the second cooking time display area 233 can be located between the cooking information display area 231 and the first cooking time display area 232, the icon display area 234 can be arranged surrounding the second cooking time display area 233, and the cooking temperature display area 234 can be arranged between the first cooking time display area 232 and the second cooking time display area 233.

When the cooking temperature is changed during a cooking process (e.g. in a cook mode including a pre-heating step), the window 230 can include a cooking temperature change display area 236 in addition to the cooking temperature display area 234.

The icon display area 234 may include a graph in a circular band shape, which indicates progress of a cooking process using light and shade or gradation effect.

Figure 5B:
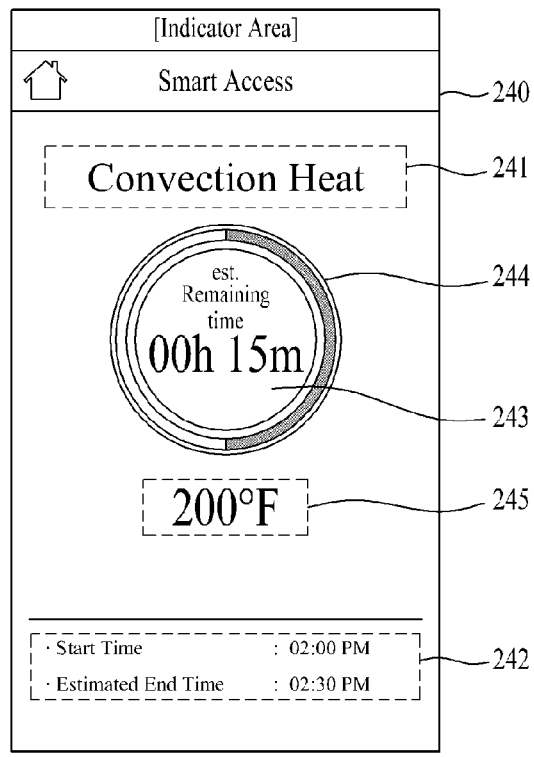

Referring to FIG. 5B, when the smart access menu 202 is selected and the oven 10 is in a cooking state, the controller 180 can display, on the display unit 151, a window 240 including a cooking information display area 241 in which at least one of a cook mode and the name of a dish is displayed, a first cooking time display area 242 in which at least one of a start time, an end time and a cooking processing time is displayed, a cooking temperature display area 245 in which a cooking temperature is displayed, a second cooking time display area 243 in which a remaining time is displayed, and an icon display area 244 in which progress of a cooking process is indicated as a graph.

Compared to FIG. 5A, the window 240 shown in FIG. 5B may not include the cooking temperature change display area 236 and the cooking information display area 241 may display a cook mode instead of the name of a dish.

Figure 5C:
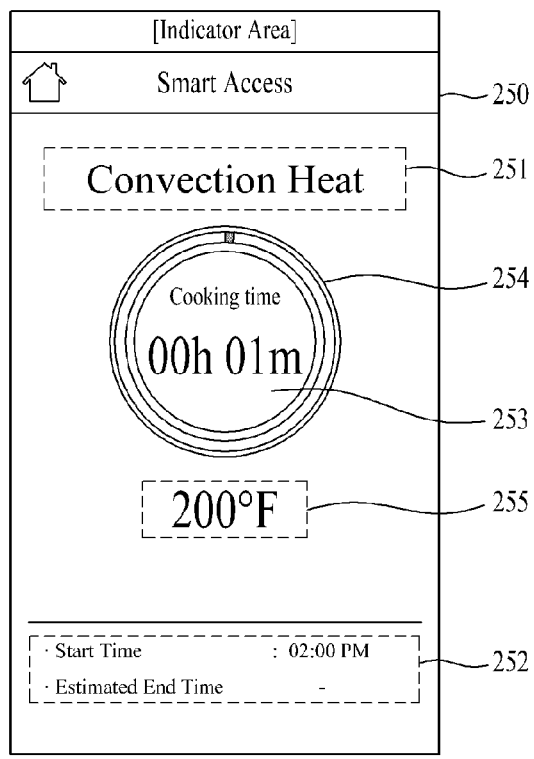

Referring to FIG. 5C, when the smart access menu 202 is selected and the oven 10 is in a cooking state, the controller 180 can display, on the display unit 151, a window 250 including a cooking information display area 251 in which at least one of a cook mode and the name of a dish is displayed, a first cooking time display area 252 in which at least one of a start time, an end time and a cooking processing time is displayed, a cooking temperature display area 255 in which a cooking temperature is displayed, a second cooking time display area 253 in which a remaining time is displayed, and an icon display area 254 in which progression of a cooking process is indicated as a graph.

Compared to FIG. 5A, the window 250 shown in FIG. 5C may not include the cooking temperature change display area 236, the cooking information display area 251 may display a cook mode instead of the name of a dish, and the first cooking time display area 252 may not display the end time.

Figure 5D:
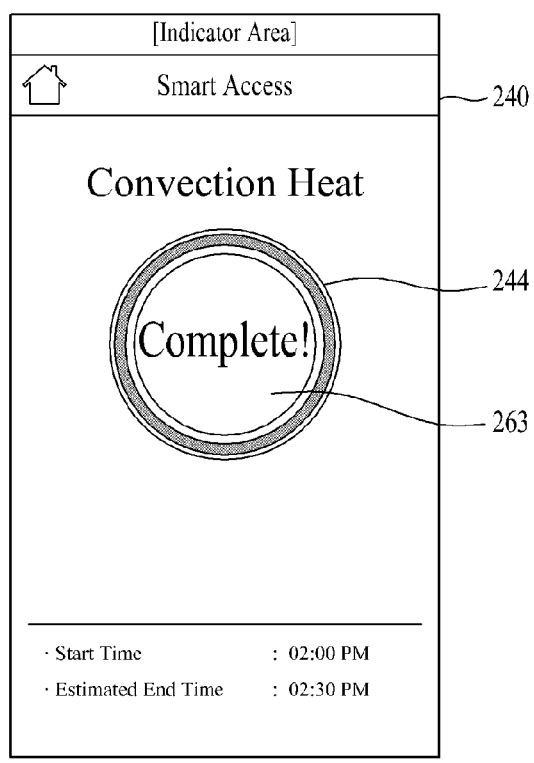

Referring to FIGS. 5B and 5D, upon reception of a cooking completion signal from the oven 10, the controller 180 can convert information displayed on at least one of the cooking time display areas 242 and 243 and the cooking temperature display area 245 to cooking completion indication information 263.

Alternatively, the controller 180 can additionally display a pop-up window (not shown) displaying cooking completion indication information on the display unit 151 upon reception of the cooking completion signal from the oven 10. For example, the controller 180 can display the pop-up window on the display unit 151 such that the pop-up window and the window 240 shown in FIG. 5B overlap.

Here, a pop-up window refers to a window additionally displayed on an existing window or the execution screen. The pop-up window may be smaller than the execution screen or window and may include a control command input region.

Figure 5E:
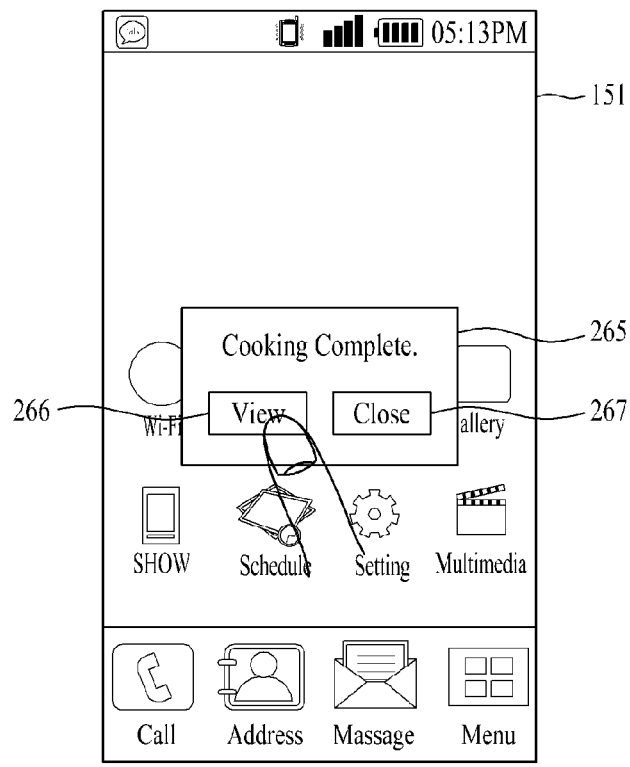

Referring to FIG. 5E, upon reception of the cooking completion signal from the oven 10 while the application 182 is not activated, the controller 180 can display a pop-up window 265 for displaying cooking completion indication information on the display unit 151. In this case, the pop-up window 265 includes control command input regions such as 'view' 266 and 'close' 267. For example, when the user selects 'view' 266, the controller 180 can activate the application 182 and, at the same time, display the window 240 shown in FIG. 5D on the display unit 151.

Figure 5F:
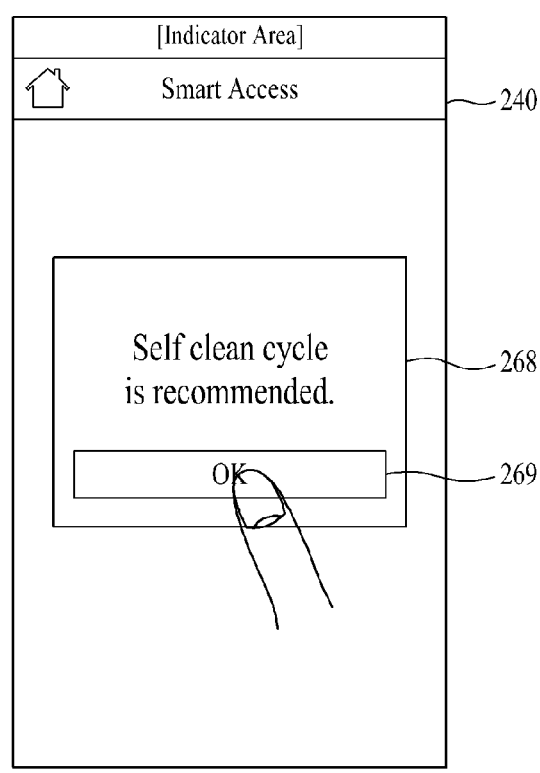

Referring to FIG. 5F, upon reception of the cooking completion signal from the oven 10, the controller 180 can display a pop-up window 268 for recommending a self-cleaning process on the display unit 151. The pop-up window 268 can include an input menu 269 by which the self-cleaning process is selected.

Referring to FIGS. 5D and 5F, when the user taps the window 240 shown in FIG. 5D, the controller 180 can switch the window 240 shown in FIG. 5D to the window 240 shown in FIG. 5F.

The user usually performs the self-cleaning process when a cooking process is ended. Accordingly, the controller 180 displays the pop-up window 268 for recommending the self-cleaning process on the display unit 151 upon completion of a cooking process in order to improve user convenience.

Figure 6A:
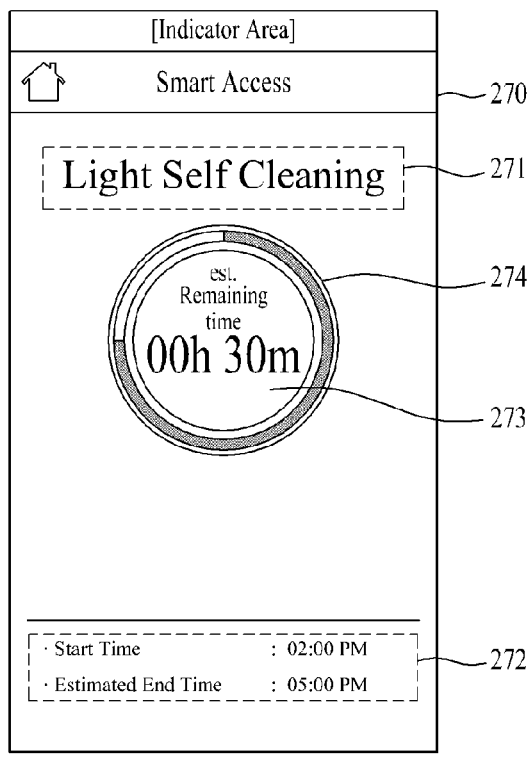
FIGS. 6A to 6C show windows which display information related to a self cleaning state of the cooking apparatus.
Figure 6B:
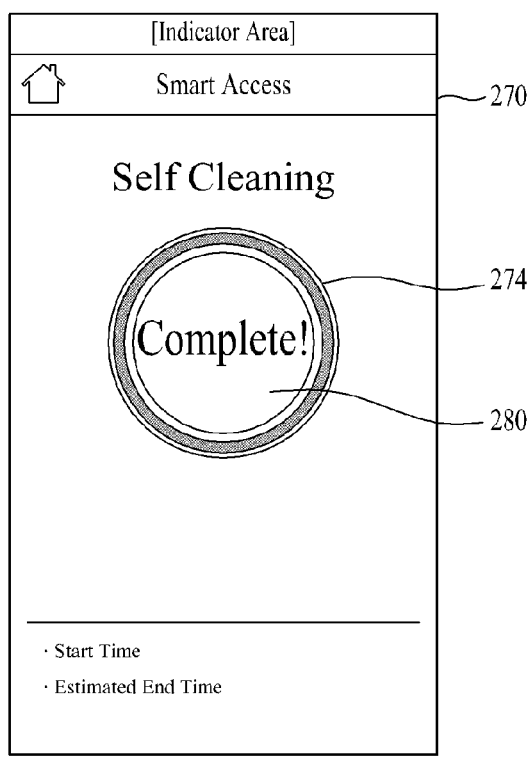
Figure 6C:
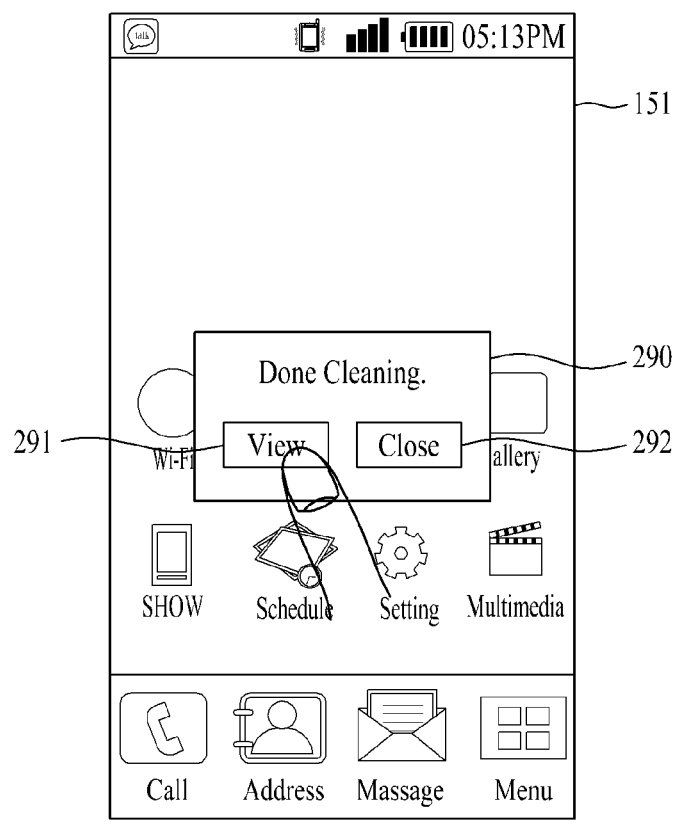

FIGS. 6A to 6C show windows which display information related to a self-cleaning state of the cooking apparatus.

When the operating state of the oven 10 corresponds to the self-cleaning state, the controller 180 can display, on the display unit 151, a window 270 including a cleaning information display area 271 in which a self-cleaning degree is displayed and cleaning time display areas 272 and 273 in which at least one of a cleaning start time, a cleaning end time, a cleaning processing time and a remaining time is displayed.

Specifically, referring to FIGS. 3 and 6A, when the smart access menu 202 is selected and the oven 10 is in the self-cleaning state, the controller 180 can display, on the display unit 151, the window 270 which includes the cleaning information display area 271 in which a self-cleaning degree is displayed, the first cleaning time display area 272 in which at least one of a cleaning start time, a cleaning end time and a cleaning processing time is displayed, the second cleaning time display area 273 in which a remaining time is displayed, and an icon display area 274 in which progress of a cleaning process is displayed as a graph.

The window 270 may be referred to as a self-cleaning state window for convenience of description.

The self-cleaning degree can be classified into 'light', 'middle' and 'heavy' and a self-cleaning processing time can be determined on the basis of the self-cleaning degree. In an exemplary embodiment, the self-cleaning processing time can be determined as 3 hours when the self-cleaning degree is 'light', determined as 4 hours when the self-cleaning degree is 'middle', and determined as 5 hours when the self-cleaning degree is 'heavy'.

The second cleaning time display area 273 can be located between the cleaning information display area 271 and the first cleaning time display area 272, and the icon display area 274 can be arranged surrounding the second cleaning time display area 273.

The icon display area 274 can include a graph in a circular band shape, which can indicate progress of a self-cleaning process using light and shadow or gradation effect.

Referring to FIGS. 6A and 6B, upon reception of a self-cleaning completion signal from the oven 10, the controller 180 can convert information displayed on at least one of the first cleaning time display area 272 and the second cleaning time display area 273 into self-cleaning completion indication information 280.

Alternatively, the controller 180 can additionally display a pop-up window (not shown) displaying the self-cleaning completion indication information on the display unit 151 upon reception of the self-cleaning completion signal from the oven 10. For example, the controller 180 can display the pop-up window on the display unit 151 such that the pop-up window and the window 270 shown in FIG. 6B overlap.

Here, a pop-up window refers to a window additionally displayed on an existing window or the execution screen. The pop-up window may be smaller than the execution screen or window and may include a control command input region.

Referring to FIG. 6C, upon reception of the self-cleaning completion signal from the oven 10 while the application 182 is not activated, the controller 180 can display a pop-up window 290 displaying the self-cleaning completion indication information on the display unit 151.

The pop-up window 290 includes control command input regions such as 'view' 291 and 'close' 292. For example, when the user selects 'view' 291, the controller 180 can activate the application 182 and, at the same time, display the window 270 shown in FIG. 6B on the display unit 151.

Figure 7:
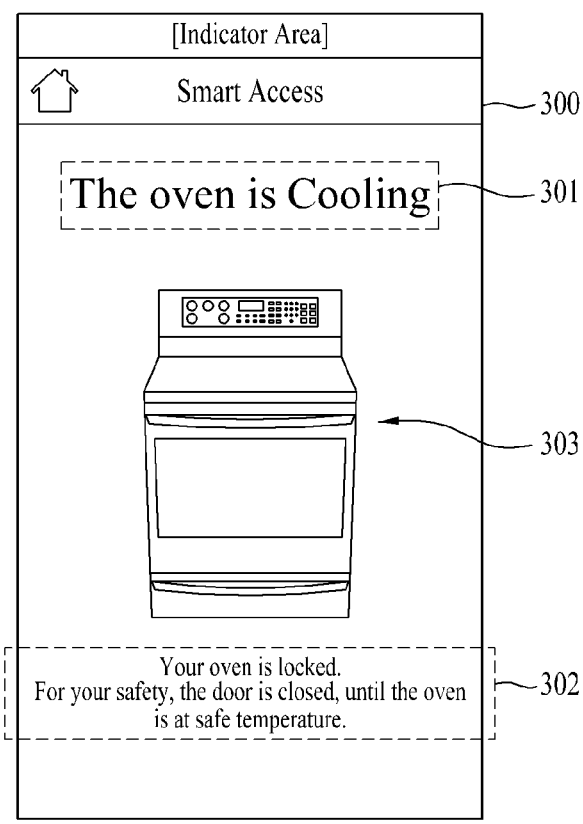
FIG. 7 shows a window which displays information related to a cooling state of the cooking apparatus.

FIG. 7 shows a window which displays information related to a cooling state of the cooking apparatus.

Referring to FIG. 7, when the oven 10 is in a cooling state, a window 300 including oven state display areas 301 and 302 in which the cooling state is displayed and an icon display area 303 in which an icon including at least one of a photo, symbol and picture relating to the oven 10 is displayed is displayed on the display unit 151.

Referring to FIGS. 3 and 7, when the smart access menu 202 is selected and the oven 10 is in the cooling state, the execution screen 200 is switched to the window 300 shown in FIG. 7 on the display unit 151.

The window 300 displaying the cooling state of the oven 10 may be referred to as a cooling state window for convenience of description.

Specifically, the oven state display areas 301 and 302 may include the first cooling state display area 301 and the second cooling state display area 302 and the icon display area 303 can be arranged between the first cooling state display area 301 and the second cooling state display area 302.

In an exemplary embodiment, the first cooling state display area 301 can be located at the top of the display unit 151, the icon display area 303 can be located at the center of the display unit 151, and the second cooling state display area 302 can be located at the bottom of the display unit 151.

The first cooling state display area 301 can simply display the cooling state of the oven 10, whereas the second cooling state display area 302 can display a detailed oven state including a door closed state, etc.

A photo of the oven 10 may be displayed on the icon display area 303.

As described above, the oven 10 can perform a cooling process upon completion of the self-cleaning process.

Referring to FIGS. 6B, 6C and 7, the pop-up window 290 for providing the self-cleaning completion indication information includes the control command input regions such as 'view' 291 and 'close' 292. For example, when the user selects 'view' 291, the controller 180 can activate the application 182 and, at the same time, display the window 270 shown in FIG. 6B on the display unit 151.

When the user taps the window 270 shown in FIG. 6B, the controller 180 can display, on the display unit 151, the window 300 including the oven state display areas 301 and 302 in which the cooling state is displayed and the icon display area 303 in which an icon including at least one of a photo, symbol and picture relating to the oven 10 is displayed.

Figure 8:
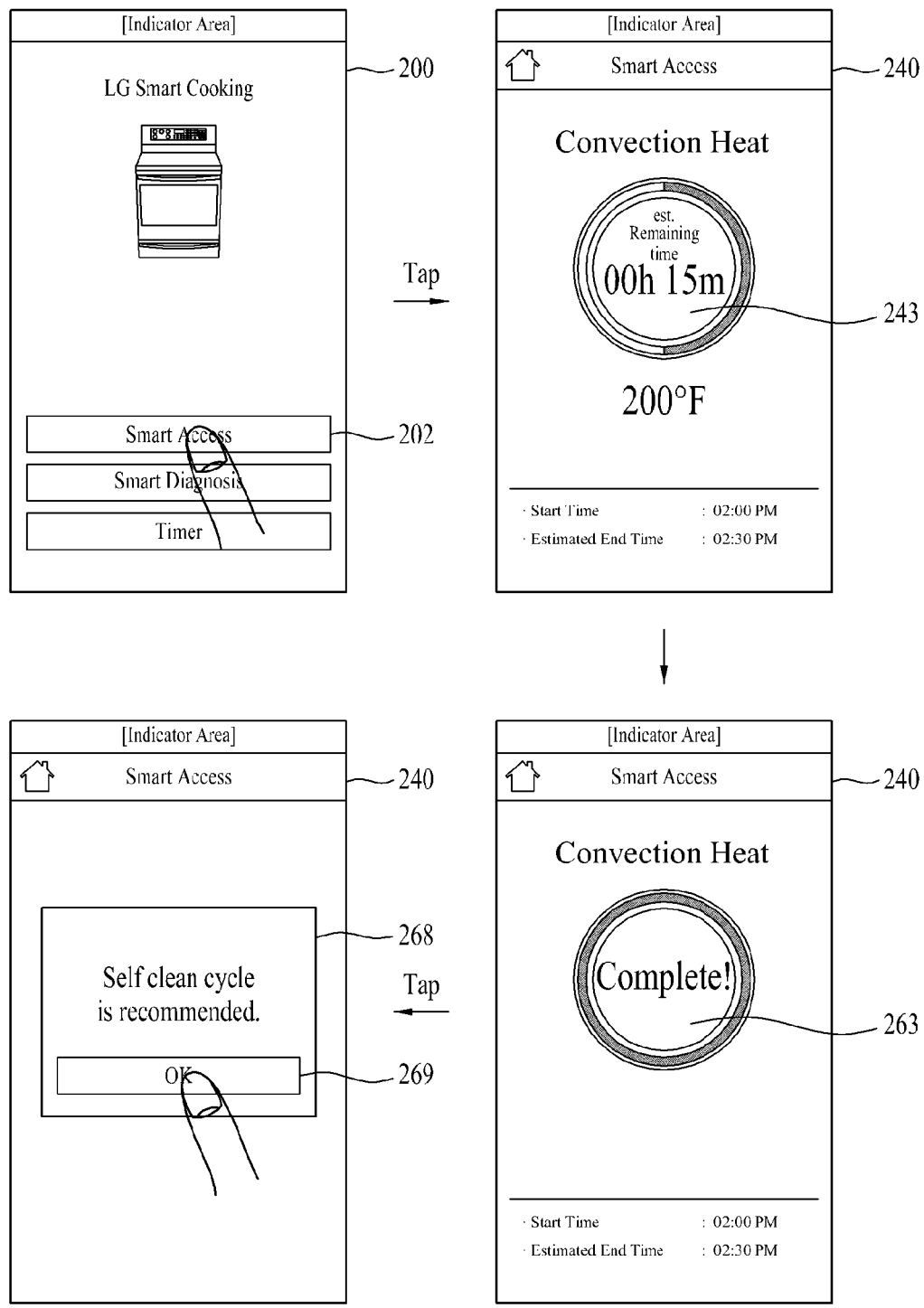
FIGS. 8 and 9 illustrate operation of a user interface according to a cooking state of the cooking apparatus.
Figure 9:
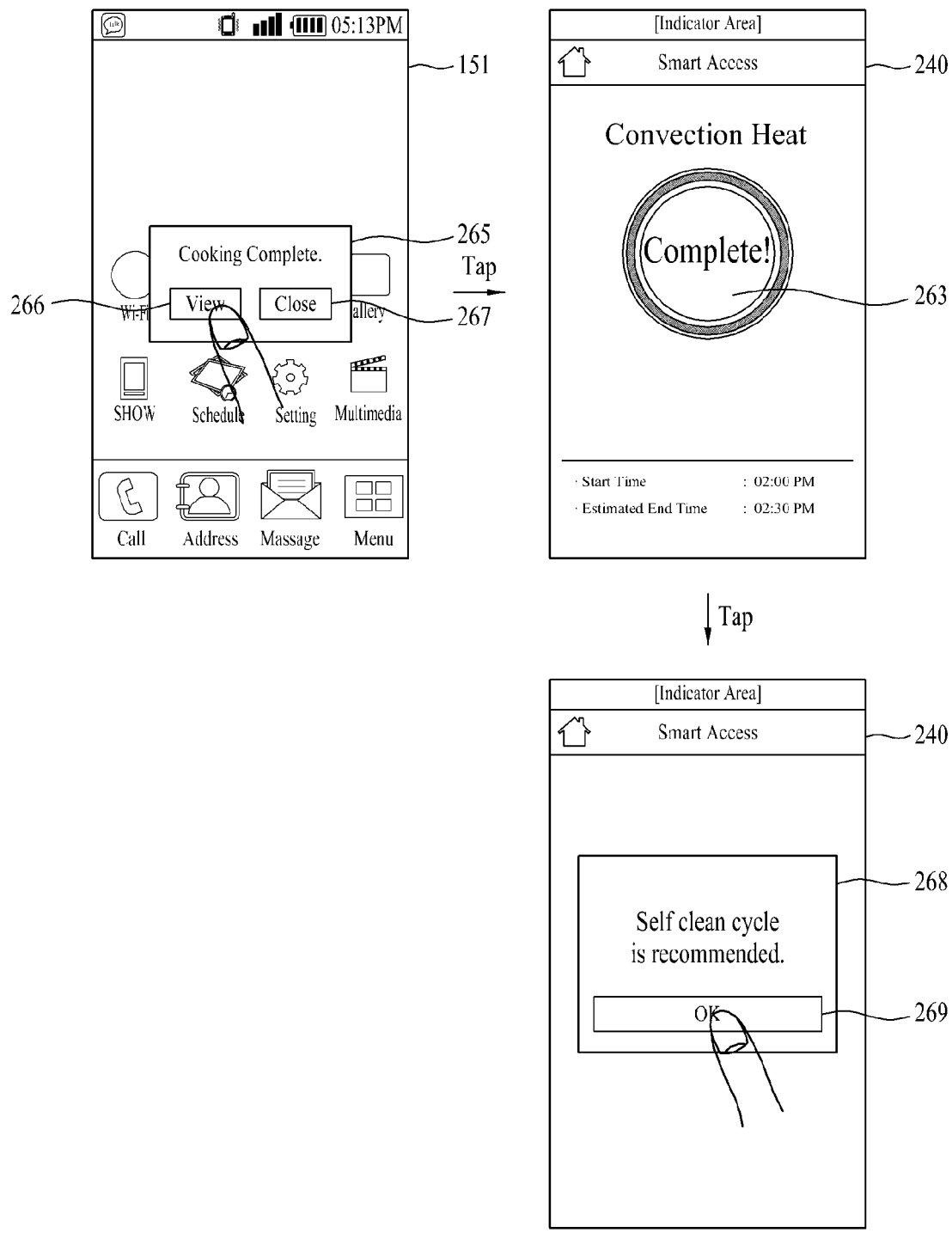

FIGS. 8 and 9 illustrate operation of a user interface according to a cooking state of the cooking apparatus.

In an exemplary embodiment, a method for controlling the oven using the mobile terminal may include a step of displaying the execution screen including the smart access menu upon activation of the application, a step of displaying the cooking state window when the smart access menu of the execution screen is selected and the oven is in a cooking state, a step of displaying cooking completion indication information upon completion of cooking, and a step of displaying the pop-up window for recommending the self-cleaning process on the display unit.

Referring to FIGS. 2 and 8, upon execution of the application 182, the controller 180 displays the execution screen 200 including one or more menu items. The menu items include the smart access menu 202 for requesting communication with the oven 10.

Referring to FIGS. 5B and 8, when the smart access menu 202 is selected and the oven 10 is in a cooking state, the controller 180 can display, on the display unit 151, the window 240 which includes the cooking information display area 241 in which at least one of a cook mode and the name of a dish is displayed, the first cooking time display area 242 in which at least one of a start time, an end time and a cooking processing time is displayed, the cooking temperature display area 245 in which a cooking temperature is displayed, the second cooking time display area 243 in which a remaining time is displayed, and the icon display area 244 in which progress of a cooking process is indicated as a graph.

Referring to FIGS. 5D and 8, upon reception of a cooking completion signal from the oven 10, the controller 180 can convert information displayed on at least one of the cooking time display areas 242 and 243 and the cooking temperature display area 245 to cooking completion indication information 263.

To improve user convenience, the controller 180 can display the pop-up window 268 for recommending the self-cleaning process on the display 151 upon reception of the cooking completion signal from the oven 10. The pop-up window 268 can include the input menu 269 by which the self-cleaning process is selected.

Referring to FIGS. 5E and 9, upon reception of the cooking completion signal from the oven 10 while the application 182 is not activated, the controller 180 can display the pop-up window 265 displaying cooking completion indication information on the display unit 151.

As described above, the pop-up window 265 includes the control command input regions such as 'view' 266 and 'close' 267. For example, when the user selects 'view' 266, the controller 180 can activate the application 182 and, at the same time, display the window 240 shown in FIG. 5D on the display unit 151.

When the user taps the window 240 shown in FIG. 5D, the controller 180 can switch the window 240 shown in FIG. 5D to the window 240 shown in FIG. 5F. Specifically, the controller 180 displays the pop-up window 268 for recommending the self-cleaning process on the display unit 151. The pop-up window 268 can include the input menu 269 by which the self-cleaning process is selected.

Figure 10:
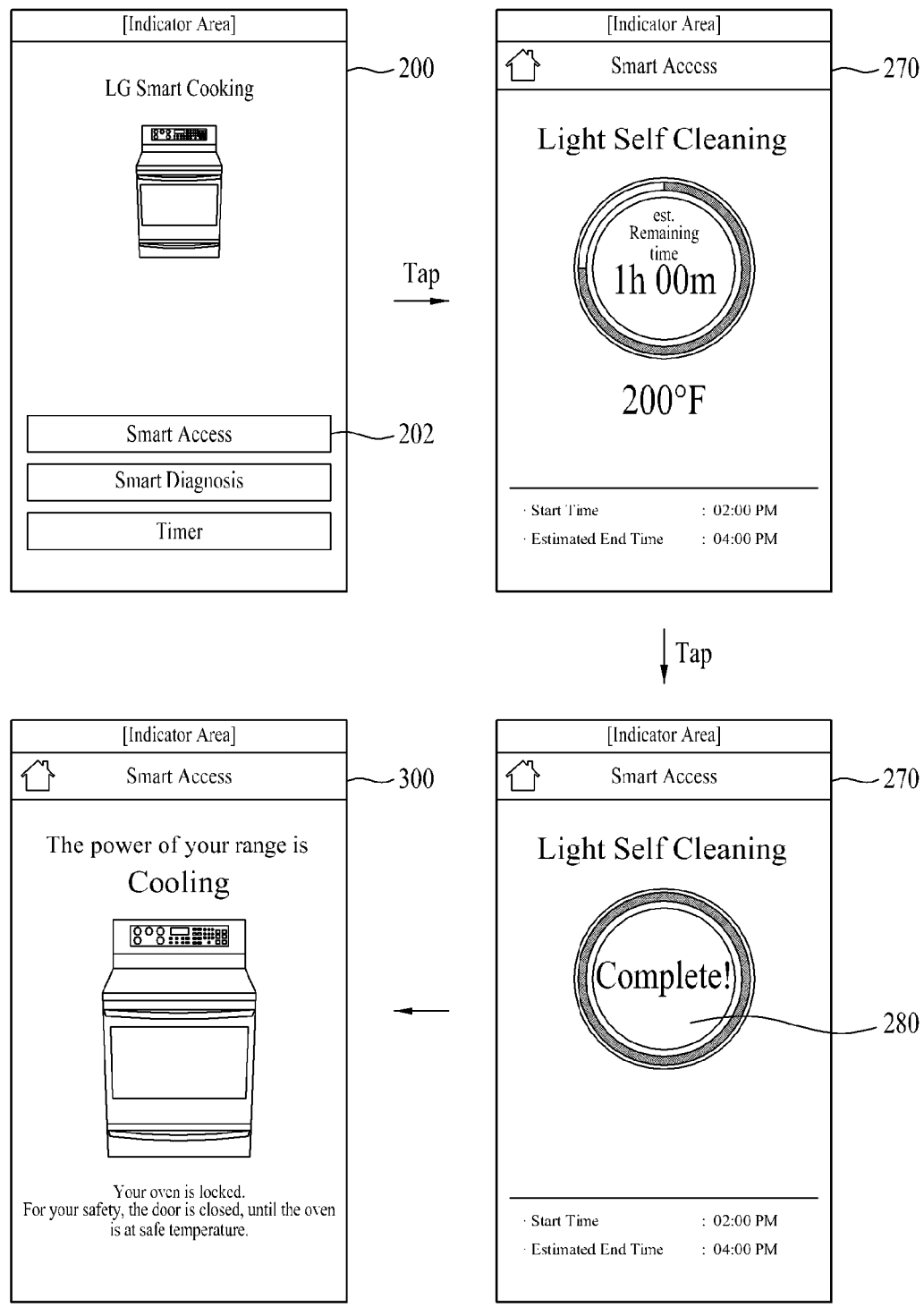
FIGS. 10 and 11 illustrate operation of the user interface according to a self cleaning state of the cooking apparatus.
Figure 11:
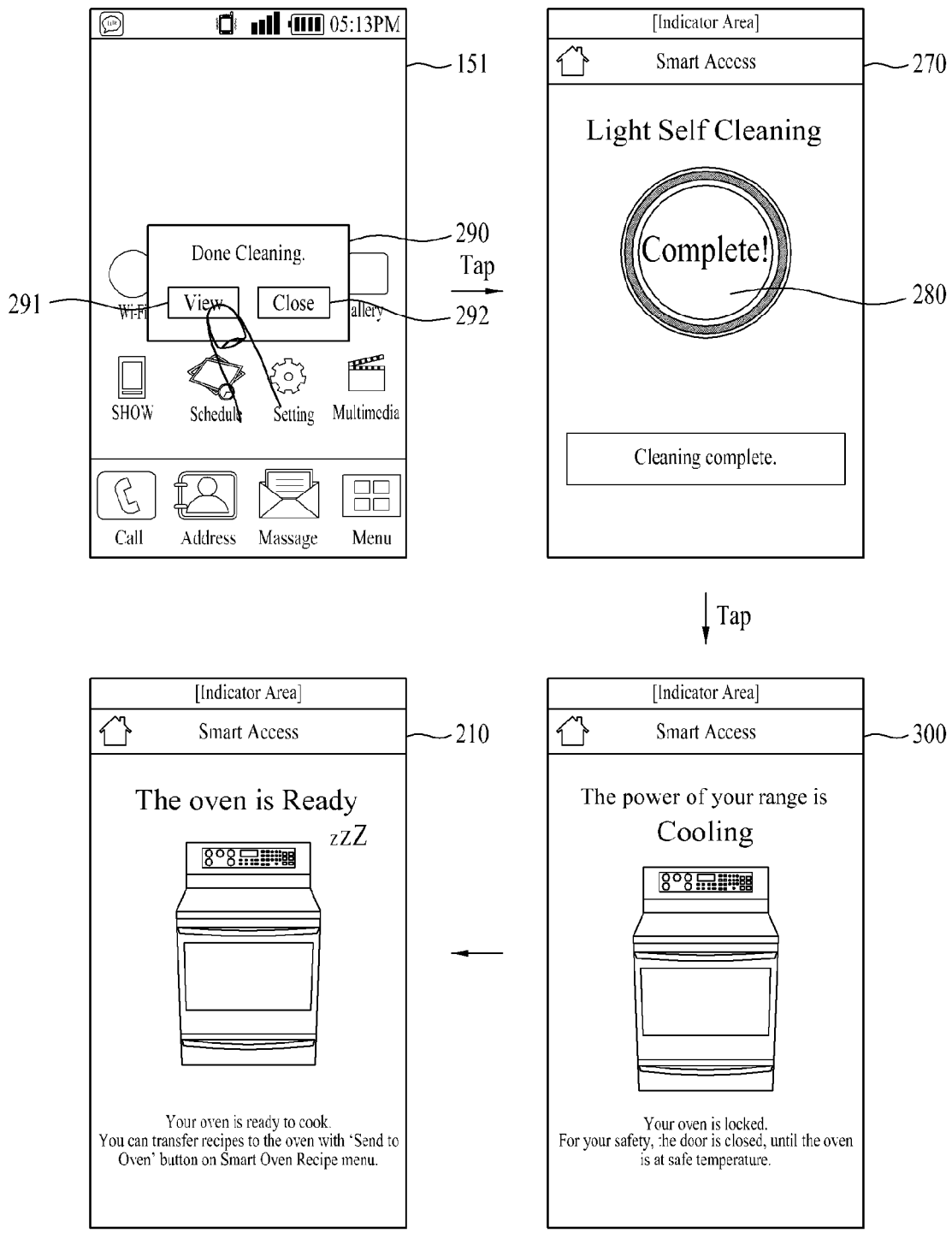

FIGS. 10 and 11 illustrate operation of the user interface according to the self cleaning state of the cooking apparatus.

Referring to FIG. 10, the controller 180 displays the execution screen 200 including one or more menu items on the display unit 151 upon execution of the application 182. The menu items include the smart access menu 202 for requesting communication with the oven 10.

Referring to FIGS. 6A and 10, when the smart access menu 202 is selected and the oven 10 is in the self-cleaning state, the controller 180 can display, on the display unit 151, the window 270 which includes the cleaning information display area 271 in which a self-cleaning degree is displayed, the first cleaning time display area 272 in which at least one of a cleaning start time, a cleaning end time and a cleaning processing time is displayed, the second cleaning time display area 273 in which a remaining time is displayed, and the icon display area 274 in which progress of a cleaning process is displayed as a graph.

Referring to FIGS. 6B and 10, upon reception of a self-cleaning completion signal from the oven 10, the controller 180 can convert information displayed on at least one of the first cleaning time display area 272 and the second cleaning time display area 273 to the self-cleaning completion indication information 280.

When the user taps the window 270 shown in FIG. 6B, the controller 180 can display, on the display unit 151, the window 300 that includes the oven state display areas 301 and 302 in which the cooling state of the oven 10 is displayed and the icon display area 303 in which an icon including at least one of a photo, symbol and picture relating to the oven 10 is displayed, as shown in FIG. 7.

Referring to FIG. 10, a method for controlling the oven using the mobile terminal may include a step of displaying self-cleaning information when the smart access menu 202 is selected and the oven 10 is in the self-cleaning state, a step of displaying self-cleaning completion information upon completion of self-cleaning, and a step of displaying cooling state information.

Referring to FIG. 11, upon reception of the self-cleaning completion signal from the oven 10 while the application 182 is not activated, the controller 180 can display the pop-up window 290 displaying self-cleaning completion indication information on the display unit 151.

The pop-up window 290 includes the control command input regions such as 'view' 291 and 'close' 292. When the user selects 'view' 291, the controller 180 can activate the application 182 and, at the same time, display the window 270 shown in FIG. 6B on the display unit 151.

Upon completion of the self-cleaning process, the controller 180 can display the window 300 representing that the oven 10 is performing the cooling process.

In an exemplary embodiment, when the user taps the window 270 shown in FIG. 6B, the controller 180 can display, on the display unit 151, the window 300 including the oven state display areas 301 and 302 in which the cooling state is displayed and the icon display area 303 in which an icon including at least one of a photo, symbol and picture relating to the oven 10 is displayed.

Upon completion of the cooling process, the controller 180 can display the window 210 representing that the oven 10 is in the waiting state on the display unit 151.

Figure 12:
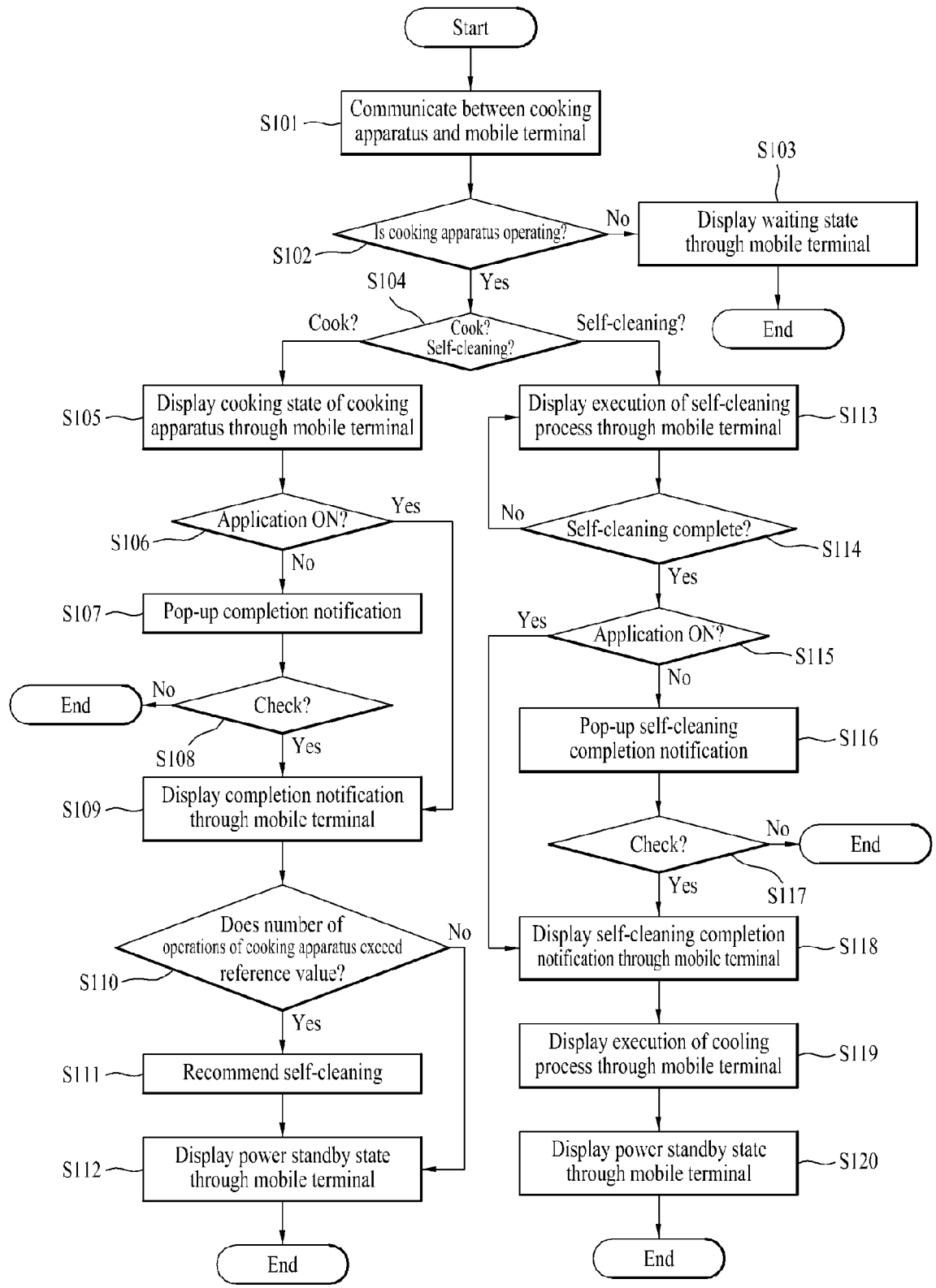
FIG. 12 is a flowchart illustrating control flows of a mobile terminal and a cooking apparatus according to an exemplary embodiment of the present invention.

FIG. 12 is a flowchart illustrating control flows of the mobile terminal and the cooking apparatus according to an exemplary embodiment of the present invention.

Referring to FIG. 12, a method for controlling the mobile terminal and the oven may include a step S101 in which the mobile terminal and the oven communicate with each other and a step S102 of checking the operating state of the oven.

An oven control method may include a step S103 of displaying a waiting state of the oven on the display unit of the mobile terminal when the oven does not operate.

The oven control method may include a step S104 of checking whether the oven is in a cooking state or in a self-cleaning state when the oven operates.

When the cooking apparatus is in a cooking state, the cooking state of the oven can be displayed on the display unit 151 of the mobile terminal (S105), and activation of the application 182 can be checked after a predetermined time (S106).

When the application is not activated, cooking completion information can be displayed on a pop-up window (S107), and then it is determined whether the user checks the pop-up window (S108). When the user checks the pop-up window, the cooking completion information is displayed on the display unit of the mobile terminal (S109).

If the application is activated, the step S109 of displaying the cooking completion information on the display unit of the mobile terminal can be directly performed.

Then, the number of operations of the oven can be checked (S110). When the number of operations of the oven exceeds a predetermined reference value, the self-cleaning process can be recommended (S111). Upon completion of the self-cleaning process, the power standby state of the oven can be displayed on the display unit of the mobile terminal (S112).

When the oven is in the self-cleaning state, the self-cleaning state of the oven can be displayed on the display unit of the mobile terminal (S113). It is checked whether the self-cleaning process is completed after a predetermined time (S114), and activation of the application is checked (S115).

When the application is not activated, self-cleaning completion information can be displayed on a pop-up window (S116) and it is determined whether the user checks the pop-up window (S117). When the user checks the pop-up window, self-cleaning completion information can be displayed on the display unit of the mobile terminal (S118).

When the application is activated, the step S118 of displaying the self-cleaning completion information on the display unit of the mobile terminal can be directly performed.

Upon completion of the self-cleaning process, progress of a cooling process is displayed on the display unit of the mobile terminal (S119). Upon completion of the cooling process, the power standby state of the oven is displayed on the display unit of the mobile terminal (S120).

As described above, according to the mobile terminal relating to the embodiments of the present invention, it is possible to transmit/receive information or a signal to/from a cooking apparatus and to improve user convenience.

Furthermore, it is possible to remotely monitor a state of the cooking apparatus and receive a control command with respect to the cooking apparatus.

In addition, it is possible to check a state of the cooking apparatus in real time and remotely perform a pre-heating step and a self-cleaning step.

Moreover, it is possible to effectively display information about a state of the cooking apparatus and recommend subsequent processes upon completion of a cooking process such that a user can select a subsequent process.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a wireless communication unit for communication with a cooking apparatus;

a display unit for displaying predetermined information;
an application implemented on the display unit and including a user interface relating to the cooking apparatus; and
a controller for controlling the application, receiving state information of the cooking apparatus through the wireless communication unit, and transmitting a control command with respect to the cooking apparatus,
wherein the controller displays an execution screen including one or more menu items upon execution of the application, the menu items including a smart access menu for requesting communication with the cooking apparatus,
wherein the controller displays, on the display unit, a window including a cooking apparatus state display area in which a state of the cooking apparatus is displayed and an icon display area in which an icon including at least one of a photo, symbol and picture relating to the cooking apparatus is displayed upon selection of the smart access menu,
wherein the controller displays a pop-up window for displaying cooking completion indication information on the display unit upon receiving a cooking completion signal from the cooking apparatus while the application is not activated, and control command input regions including view and close are provided on the pop-up window,
wherein the state of the cooking apparatus includes a waiting state or an operating state, and the operating state includes a cooking state, a cooling state or a self-cleaning state, and
wherein the controller displays a pop-up window for recommending a self-cleaning process on the display unit upon receiving the cooking completion signal from the cooking apparatus, and the pop-up window includes an input menu by which the self-cleaning process is selected.

2. The mobile terminal according to claim 1, wherein, when the operating state corresponds to the cooking state, the controller displays, on the display unit, a window including a cooking information display area in which at least one of a cook mode and the name of a dish is displayed, a cooking time display area in which at least one of a cooking start time, a cooking end time, a cooking processing time and a remaining time is displayed, and a cooking temperature display area in which a cooking temperature is displayed.

3. The mobile terminal according to claim 1, wherein the controller activates the application when the view is selected by user.

4. The mobile terminal according to claim 3, wherein the controller displays a cooking completion information including a start time of cooking and an estimated end time of cooking on the display unit when the view is selected by user.

5. The mobile terminal according to claim 2, wherein the controller converts information displayed on at least one of the cooking time display area and the cooking temperature display area into cooking completion indication information upon receiving the cooking completion signal from the cooking apparatus while the application is activated.

6. The mobile terminal according to claim 1, wherein, when the operating state corresponds to the self-cleaning state, the controller displays, on the display unit, a window including a self-cleaning information display area in which a self-cleaning degree is displayed and a self-cleaning time display area in which at least one of a start time, an end time, a selfcleaning processing time and a remaining time is displayed.

7. The mobile terminal according to claim 6, wherein the window includes an icon display area in which progress of self-cleaning is indicated through a graph.

8. The mobile terminal according to claim 6, wherein the controller displays a pop-up window for displaying self-cleaning completion indication information on the display unit upon receiving a self-cleaning completion signal from the cooking apparatus while the application is activated.

9. The mobile terminal according to claim 6, wherein the controller displays a pop-up window for displaying self-cleaning completion indication information on the display unit upon receiving the self-cleaning completion signal from the cooking apparatus while the application is not activated, and control command input regions including view and close are provided on the pop-up window.

10. The mobile terminal according to claim 9, wherein the controller activates the application when the view is selected by user.

11. The mobile terminal according to claim 10, wherein the controller displays a cooking completion information including a start time of the self-cleaning and an estimated end time of the self-cleaning on the display unit when the view is selected by user.

12. The mobile terminal according to claim 8, wherein the controller displays a window including a cooking apparatus state display area in which a waiting state of the cooking apparatus is displayed and an icon display area in which an icon including at least one of a photo, symbol and picture relating to the cooking apparatus is displayed on the display unit upon selection of the pop-up window.

13. The mobile terminal according to claim 8, wherein the controller displays a window including a cooking apparatus state display area in which a cooling state of the cooking apparatus is displayed and an icon display area in which an icon including at least one of a photo, symbol and picture relating to the cooking apparatus is displayed on the display unit upon selection of the pop-up window.

14. The mobile terminal according to claim 1, wherein, when the state of the cooking apparatus corresponds to the waiting state, at least one of a pre-heating menu and a selfcleaning menu is additionally displayed on the window and, when the pre-heating menu or the self-cleaning menu is selected, the controller controls the cooking apparatus to perform a process corresponding to the selected menu.

15. A mobile terminal, comprising:
a wireless communication unit for communication with a cooking apparatus;
a display unit for displaying predetermined information;
an application implemented on the display unit and including a user interface relating to the cooking apparatus; and
a controller for controlling the application, receiving state information of the cooking apparatus through the wireless communication unit, and transmitting a control command with respect to the cooking apparatus,
wherein the controller displays an execution screen including one or more menu items upon execution of the application, the menu items including a smart access menu for requesting communication with the cooking apparatus,
wherein, when the smart access menu is selected and a state of the cooking apparatus corresponds to a cooking state, the controller displays, on the display unit, a window including a cooking information display area in which at least one of a cook mode and the name of a dish is displayed, a first cooking time display area in which at least one of a cooking start time, a cooking end time and a cooking processing time is displayed, a cooking temperature display area in which a cooking temperature is displayed, a second cooking time display area in which a remaining time is displayed, and an icon display area in which progress of a cooking process is indicated through a graph, wherein the controller displays a pop-up window for displaying cooking completion indication information on the display unit upon receiving a cooking completion signal from the cooking apparatus while the application is not activated, and control command input regions including view and close are provided on the pop-up window, and wherein the controller displays a pop-up window for recommending a self-cleaning process on the display unit upon receiving the cooking completion signal from the cooking apparatus, and the pop-up window includes an input menu by which the self-cleaning process is selected.

16. The mobile terminal according to claim 15, wherein the second cooking time display area is located between the cooking information display area and the first cooking time display area, the icon display area is arranged surrounding the second cooking time display area, and the cooking temperature display area is located between the first cooking time display area and the second cooking time display area.

17. The mobile terminal according to claim 15, wherein when the view is selected by user, the controller activates the application and the controller displays a cooking completion information including a start time of cooking and an estimated end time of cooking on the display unit.

18. The mobile terminal according to claim 15, wherein the controller displays a pop-up window for displaying self-cleaning completion indication information on the display unit upon receiving the self-cleaning completion signal from the cooking apparatus while the application is not activated, and control command input regions including view and close are provided on the pop-up window.

* * * * *